US011975399B2

United States Patent
Hammer et al.

(10) Patent No.: US 11,975,399 B2
(45) Date of Patent: May 7, 2024

(54) METHOD FOR WELDING BALLS

(71) Applicant: Bayerische Motoren Werke Aktiengesellschaft, Munich (DE)

(72) Inventors: Maik Hammer, Bruckberg (DE); Johann Niekerk, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 823 days.

(21) Appl. No.: 17/049,592

(22) PCT Filed: Jun. 13, 2019

(86) PCT No.: PCT/EP2019/065437
§ 371 (c)(1),
(2) Date: Oct. 22, 2020

(87) PCT Pub. No.: WO2020/011476
PCT Pub. Date: Jan. 16, 2020

(65) Prior Publication Data
US 2021/0237194 A1 Aug. 5, 2021

(30) Foreign Application Priority Data
Jul. 9, 2018 (DE) .................. 10 2018 211 315.7

(51) Int. Cl.
*B23K 11/11* (2006.01)
*B23K 11/00* (2006.01)
(Continued)

(52) U.S. Cl.
CPC ......... *B23K 11/115* (2013.01); *B23K 11/0046* (2013.01); *B23K 11/046* (2013.01);
(Continued)

(58) Field of Classification Search
CPC ... B23K 11/115; B23K 11/0046; B23K 11/36; B23K 37/0417
See application file for complete search history.

(56) References Cited

U.S. PATENT DOCUMENTS 4,327,272 A * 4/1982 Hinden ................ B23K 11/166
219/94
5,541,384 A * 7/1996 Tsuzuki .................. B23K 11/11
219/93
(Continued)

FOREIGN PATENT DOCUMENTS

CN 104093999 A 10/2014
CN 105682851 A 6/2016
(Continued)

OTHER PUBLICATIONS

International Search Report (PCT/ISA/210) issued in PCT Application No. PCT/EP2019/065437 dated Sep. 19, 2019 with English translation (seven pages).
(Continued)

*Primary Examiner* — John J Norton
*Assistant Examiner* — Franklin Jefferson Wang
(74) *Attorney, Agent, or Firm* — Crowell & Moring LLP

(57) ABSTRACT

A method for welding balls provides a component, provides at least two balls, places at least one first ball of the at least two balls on the component, and applies an electrical voltage in such a manner that a current flows through the at least two balls and through the component, wherein the at least two balls are simultaneously welded together and the first ball is simultaneously welded to the component.

18 Claims, 1 Drawing Sheet

(51) Int. Cl.
*B23K 11/04* (2006.01)
*B23K 11/36* (2006.01)
*B23K 37/04* (2006.01)
*B23K 101/06* (2006.01)
*B23K 103/04* (2006.01)

(52) U.S. Cl.
CPC .......... *B23K 11/36* (2013.01); *B23K 37/0417* (2013.01); *B23K 2101/06* (2018.08); *B23K 2103/04* (2018.08)

(56) References Cited

U.S. PATENT DOCUMENTS

| | | | |
|---|---|---|---|
| 9,550,259 B2 * | 1/2017 | Van Niekerk | B23Q 17/2428 |
| 2013/0134135 A1 | 5/2013 | Mantei et al. | |
| 2014/0251961 A1 * | 9/2014 | Karagoulis | B23K 11/115 |
| | | | 219/116 |
| 2015/0033532 A1 | 2/2015 | Van Niekerk et al. | |
| 2015/0174692 A1 * | 6/2015 | Ananthanarayanan | ...................... |
| | | | B23K 11/004 |
| 2016/0227886 A1 | 8/2016 | Van Niekerk et al. | |
| 2016/0297031 A1 | 10/2016 | Van Niekerk et al. | |
| 2017/0190368 A1 | 7/2017 | Hinkfoth | |

FOREIGN PATENT DOCUMENTS

| | | |
|---|---|---|
| DE | 10 2014 200 210 B3 | 5/2015 |
| DE | 10 2014 218 698 A1 | 3/2016 |
| DE | 10 2015 209 526 B3 | 9/2016 |
| DE | 10 2014 202 636 B4 | 10/2016 |
| DE | 10 2015 211 814 A1 | 12/2016 |
| DE | 10 2015 211 818 A1 | 12/2016 |
| DE | 10 2016 212 271 A1 | 1/2018 |
| WO | WO 2013/159982 A1 | 10/2013 |
| WO | WO 2015/104120 A1 | 7/2015 |
| WO | WO 2015/121030 A1 | 8/2015 |

OTHER PUBLICATIONS

German-language Written Opinion (PCT/ISA/237) issued in PCT Application No. PCT/EP2019/065437 dated Sep. 19, 2019 (six pages).

German-language Office Action issued in German Application No. 10 2018 211 315 .7 dated Mar. 20, 2019 (six pages).

Ding Dingqian, "Electric Welder Intermediate," China Labor Social Security Press, Jul. 2004, pp. 154-159 (nine (9) pages).

Chinese-language Office Action issued in Chinese Application No. 201980028883.8 dated Aug. 4, 2021 with English translation (13 pages).

* cited by examiner

METHOD FOR WELDING BALLS

BACKGROUND AND SUMMARY OF THE INVENTION

The present invention relates to a method for welding balls.

The welding-on of balls is known from a large number of prior patent applications or patents, for example from DE 10 2014 218 698 A1 or DE 10 2014 202 636 B4.

In some applications, it is necessary to weld two, or more than two, balls to one another and/or to another component.

It is an object of the invention to provide a method with which multiple balls can be welded in a simple and efficient manner.

An essential concept of the invention consists in using resistance welding or electric welding to simultaneously weld at least two balls and to simultaneously weld at least one of said balls to a further component.

In the method according to the invention, a component and at least two balls are firstly provided. Subsequently, at least a first of said at least two balls is mounted onto the component. Subsequently, an electrical voltage is applied such that a current flow through the at least two balls and through the component occurs. The voltage is high enough that a sufficiently large current flows through the at least two balls and through the component, which current results in simultaneous welding of the at least two balls and in simultaneous welding at least of the first of the at least two balls to the component.

Tests have shown that, with the method according to the invention, it is possible to produce very high-quality welded connections.

In the method according to the invention, welding can be performed without a protective gas atmosphere. It is nevertheless possible to generate very high-quality welded connections.

In one refinement of the invention, more than two balls are used, and here, at least two of the more than two balls are simultaneously welded to the component and at least two of the more than two balls are likewise simultaneously welded to one another. In this way, it is possible to produce complex ball connections in a single welding process.

For the production of welded connections with two or more than two balls, it is advantageous if a holding device is used by means of which some or all of the balls used are held relative to one another during the welding process. For example, it may be provided that at least two of the multiple balls are held relative to one another by means of a holding device of said type.

If the two or more than two balls are arranged, and are to be welded to one another, one behind the other in a row, use may for example be made of a tubular holding device. If all balls have the same diameter, a tube may be used whose inner diameter corresponds to or is only insignificantly larger than the outer diameter of the balls. In this way, it is possible for multiple balls to be positioned one behind the other in a row in an extremely precise manner. Here, successive balls make contact with one another.

Alternatively or in addition to this, a ring-shaped holding device may be used. The ring-shaped holding device can be placed onto the component. At least two of the balls used bear against an inner side of the ring-shaped holding device. A further ball may bear or lie against the at least two balls which bear against the inner side of the ring-shaped holding device and which bear against the component.

Preferably, a holding device is used which is composed at least at an inner side of an electrically nonconductive or electrically insulating material, or which is composed entirely of an electrically nonconductive or electrically insulating material.

If a tubular holding device is used, this should preferably likewise be composed at least at its tube inner side, or be composed entirely, of an electrically nonconductive or electrically insulating material.

According to one refinement, it may be provided that the at least two balls are pressed against the component by means of a welding electrode during the welding process.

Tests have shown that very high-quality welded connections can be produced with steel balls. The component used may preferably likewise be composed of steel. The electrical current used for the welding process may for example be a direct current.

The invention will be discussed in more detail below in conjunction with the drawing.

DETAILED DESCRIPTION OF THE DRAWINGS

Figure 1:
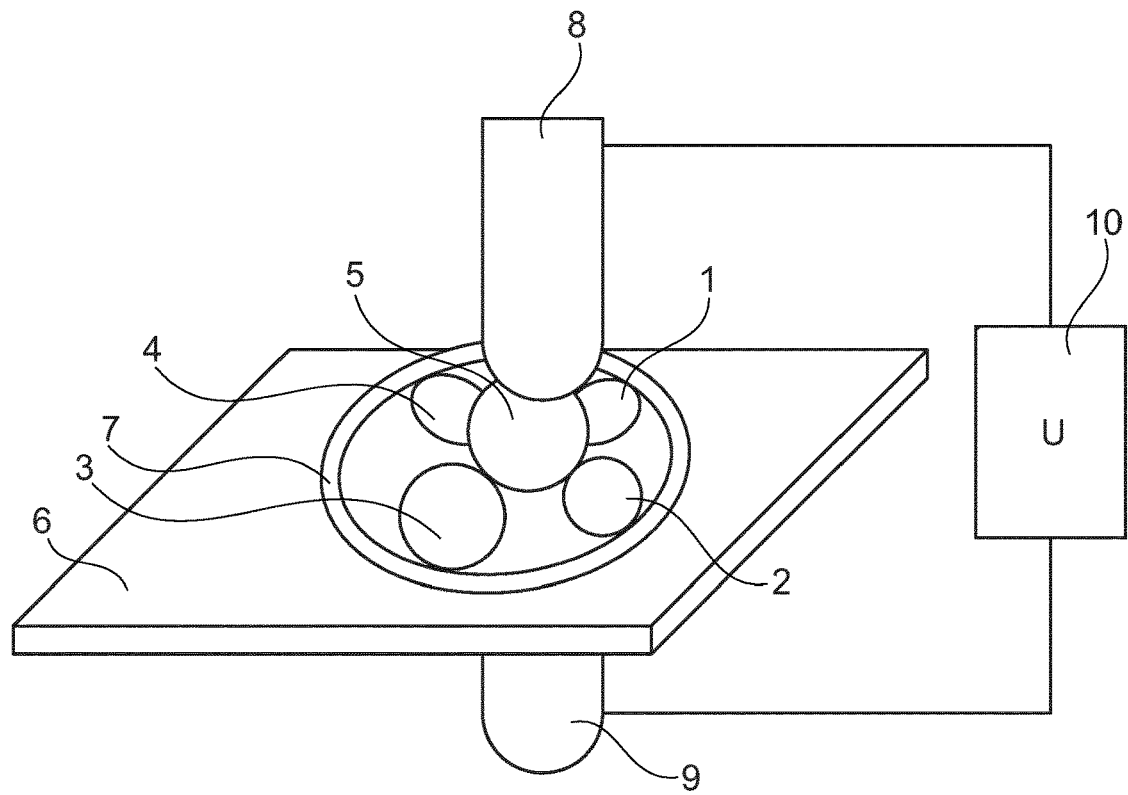
FIG. 1 shows an exemplary embodiment in which a total of five balls are welded.

FIG. 1 shows an exemplary embodiment in which a total of five balls 1, 2, 3, 4, 5 are used. The balls 1, 2, 3, 4 are firstly placed onto a component 6. By means of a holding ring 7 which is composed of an electrically nonconductive material, the balls 1-4 are held with a uniform angular spacing to one another. The ball 5 is placed into a depression formed by the balls 1, 2, 3, 4. Subsequently, a first welding electrode 8 is placed against the ball 5, and a welding electrode 9 is placed against an underside of the component 6. The balls 1-5 and the component 6 are composed of an electrically conductive material. By application of a voltage U, which is generated by a welding unit 10, a current flow from the electrode 8 via the ball 5 and onward via the balls 1-4, the component 6 and the electrode 9, is generated. The voltage U is high enough that the resulting electrical current leads to partial melting of the balls 1-5 at the contact points thereof and to partial melting of the balls 1-4 at the contact points thereof with the component 6. Welding of the balls 1-4 to the ball 5, and furthermore simultaneously welding of the balls 1-4 to the component 6, thus occur as a result. After the welding process, the holding ring 7 can be removed.

Figure 2:
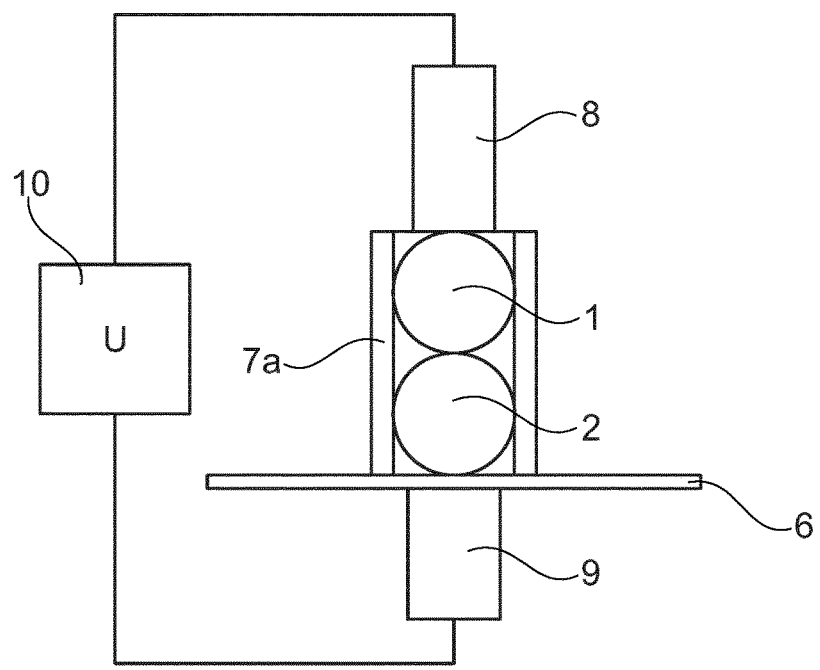
FIG. 2 shows an exemplary embodiment in which two balls are welded.

FIG. 2 shows an exemplary embodiment in which, simultaneously, two balls 1, 2 are welded, and the ball 2 is additionally welded to the component 6. In order to achieve an exact alignment of the balls 1, 2 before the welding process, a tubular holding device 7a is used. The inner diameter of the tubular holding device 7a corresponds substantially to the outer diameters of the two balls. By activation of the welding unit 10, that is to say by generation of a welding voltage U, a current flow occurs between the first welding electrode 8 and the ball 1, and from the ball 1 via the ball 2 into the component 6, and from the component 6 into the second welding electrode 9.

What is claimed is:
1. A method for welding balls, comprising:
providing a component;
providing an annular ring-shaped holding device;

providing at least two balls, wherein the annular ring-shaped holding device holds the at least two balls relative to one another during the welding process;

mounting at least one first ball of the at least two balls onto the component, wherein two balls of the at least two balls contact one another; and applying an electrical voltage such that a current flows through the at least two balls and through the component, wherein simultaneous welding of the at least two balls and simultaneous welding of the first ball and the component occurs.

2. The method according to claim 1, wherein welding is performed without a protective gas atmosphere during the welding process.

3. The method according to claim 1, wherein more than two balls are used, and
at least two of the balls are simultaneously welded to the component and at least two of the balls are likewise simultaneously welded to one another.

4. The method according to claim 1, wherein
the ring-shaped holding device is placed onto the component,
at least two balls bear against an inner side of the ring-shaped holding device and against the component, and
at least one further ball bears against the at least two balls which bear against the inner side of the ring-shaped holding device and which bear against the component.

5. The method according to claim 1, wherein
the annular ring-shaped holding device is composed at least at an inner side, or is composed entirely, of an electrically nonconductive or electrically insulating material.

6. The method according to claim 1, wherein
the at least two balls are pressed against the component by a welding electrode during the welding process.

7. The method according to claim 1, wherein
the at least two balls are steel balls.

8. The method according to claim 7, wherein
the component is a steel component.

9. The method according to claim 1, wherein
the component is a steel component.

10. The method according to claim 1, wherein
the electrical voltage with which the welding current is generated is a DC voltage.

11. A method for welding balls, comprising:
providing a component;
providing a tubular holding device;
providing at least two balls, wherein the at least two balls are introduced into the tubular holding device, arranged one behind the other in a row, and successive balls contact one another;
mounting at least one first ball of the at least two balls onto the component; and
applying an electrical voltage such that a current flows through the at least two balls and through the component, wherein simultaneous welding of the at least two balls and simultaneous welding of the first ball and the component occurs;
wherein after simultaneous welding of the at least two balls and simultaneous welding of the first ball and the component occurs, the tubular holding device is removed.

12. The method according to claim 11, wherein
welding is performed without a protective gas atmosphere during the welding process.

13. The method according to claim 11, wherein
the tubular holding device is composed at least at an inner tube side, or is composed entirely, of an electrically nonconductive or electrically insulating material.

14. The method according to claim 11, wherein
the at least two balls are pressed against the component by a welding electrode during the welding process.

15. The method according to claim 11, wherein
the at least two balls are steel balls.

16. The method according to claim 11, wherein
the component is a steel component.

17. The method according to claim 11, wherein
the component is a steel component.

18. The method according to claim 11, wherein
the electrical voltage with which the welding current is generated is a DC voltage.

* * * * *